(12) United States Patent
Sweetser et al.

(10) Patent No.: US 6,975,794 B2
(45) Date of Patent: Dec. 13, 2005

(54) METHOD AND APPARATUS FOR FABRICATING A WAVEGUIDE BRAGG GRATING USING PULSED LIGHT

(75) Inventors: John N. Sweetser, San Jose, CA (US); Anders Grunnet-Jepsen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 10/098,763

(22) Filed: Mar. 15, 2002

(65) Prior Publication Data

US 2003/0174947 A1 Sep. 18, 2003

(51) Int. Cl.[7] .................................... G02B 6/34
(52) U.S. Cl. ....................... 385/37; 430/321
(58) Field of Search .................. 385/37, 10; 359/566; 430/290, 321; 264/1.27, 1.37, 1.38

(56) References Cited

U.S. PATENT DOCUMENTS

| | | | | |
|---|---|---|---|---|
| 5,066,133 A | * | 11/1991 | Brienza | 359/566 |
| 5,604,829 A | * | 2/1997 | Bruesselbach | 385/37 |
| 5,837,169 A | * | 11/1998 | Rourke | 264/1.27 |
| 5,848,207 A | * | 12/1998 | Uetsuka et al. | 385/37 |
| 5,945,261 A | * | 8/1999 | Rourke | 430/321 |
| 6,072,926 A | | 6/2000 | Cole et al. | |
| 6,130,973 A | | 10/2000 | Lauzon et al. | |
| 6,269,208 B1 | * | 7/2001 | Bhatia et al. | 385/37 |
| 6,384,977 B1 | * | 5/2002 | Laming et al. | 385/37 |
| 6,548,225 B1 | * | 4/2003 | Hammon et al. | 430/321 |
| 6,553,163 B2 | * | 4/2003 | Tormen | 385/37 |
| 6,591,039 B2 | * | 7/2003 | Rondinella et al. | 385/37 |
| 2002/0150334 A1 | * | 10/2002 | Richardson et al. | 385/37 |
| 2003/0007729 A1 | * | 1/2003 | Rondinella et al. | 385/37 |

FOREIGN PATENT DOCUMENTS

GB 2 275 347 A 8/1994

OTHER PUBLICATIONS

PCT International Search Report for PCT International Application No.: PCT/US 03/ 07644 Mar. 9, 2003.
Cole M. J. et al.: "Moving Fibre/Phase Mask-Scanning Beam Technique for Enhanced Flexibility in Producing Fibre Gratings with Uniform Phase Mask", Electronics Letters, IEE Stevenage, GB, vol. 31, NR. 17, pp. 1488-1490 XP006003242 ISSN: 0013-5194, the whole document, Aug. 17, 1995.

* cited by examiner

*Primary Examiner*—Jared J. Fureman
(74) *Attorney, Agent, or Firm*—Blakely, Sokoloff, Taylor & Zafman LLP

(57) ABSTRACT

A system for fabricating Bragg gratings includes an optical waveguide (e.g., an optical fiber, a planar waveguide), an interference pattern generator (e.g., a transmission phase grating such as a phase mask or a diffraction grating), first motion equipment (e.g. a nanostage), a pulsed light source (e.g. an excimer laser), and second motion equipment (e.g. a stepper motor). A method for fabricating Bragg gratings using this system includes providing relative motion between the optical waveguide and the interference pattern using the nanostage, providing relative motion in discrete increments between the pulsed light source and the assemblage comprising the optical waveguide, nanostage, and interference pattern generator using the stepper motor, and successively exposing the optical waveguide to the pulsed light through the interference pattern generator when the optical waveguide and interference pattern are effectively stationary relative to the pulsed light.

25 Claims, 2 Drawing Sheets

METHOD AND APPARATUS FOR FABRICATING A WAVEGUIDE BRAGG GRATING USING PULSED LIGHT

BACKGROUND OF THE INVENTION

1. Field of the Invention

The present invention relates to fiber Bragg gratings and more particularly to a method for writing multiple waveguide grating filters at different center wavelengths.

2. Background Information

An optical transmission system transmits information from one place to another by way of a carrier whose frequency typically is in the visible or near-infrared region of the electromagnetic spectrum. A carrier with such a high frequency is sometimes referred to as an optical signal, an optical carrier, or a lightwave signal.

An optical transmission system includes several optical fibers. Each optical fiber includes several channels. A channel is a specified frequency band of an electromagnetic signal, and is sometimes referred to as a wavelength. One link of an optical transmission system typically has a transmitter, the optical fiber, and a receiver. The transmitter converts an electrical signal into the optical signal and launches it into the optical fiber. The optical fiber transports the optical signal to the receiver. The receiver converts the optical signal back into an electrical signal.

An optical transmission system that transmits more than one channel over the same optical fiber is sometimes referred to as a multiple channel system. The purpose for using multiple channels in the same optical fiber is to take advantage of the unprecedented capacity offered by optical fibers. Essentially, each channel has its own wavelength, and all wavelengths are separated enough to prevent overlap.

One way to transmit multiple channels is through wavelength division multiplexing, whereupon several wavelengths are transmitted in the same optical fiber. Typically, four channels are interleaved by a multiplexer, launched into the optical fiber, and separated by a demultiplexer at a receiver. Along the way, channels may be added or dropped using an add/drop multiplexer. Wavelength division demultiplexing elements separate the individual wavelengths using frequency-selective components such as optical gratings, which can provide high reflectivity and high wavelength selectivity with the aim of increasing the transmission capacity of optical fibers.

One such optical grating is a fiber Bragg grating, which selectively transmits or reflects specific wavelengths of light propagating within the optical fiber. A fiber Bragg grating is commonly a portion of an optical fiber that has a refractive index profile that varies periodically along the length of the optical fiber. Refractive index variations with a single period ($\Lambda$) selectively reflect light with a wavelength ($\lambda$) of $$\lambda = 2\Lambda \quad \text{(Equation 1)}.$$

Other wavelengths are transmitted essentially unimpeded. Alternatively, the period ($\Lambda$) can be chosen to vary along the length of the fiber in order to reflect a broad range of wavelength, e.g. chirped gratings. Such broadband gratings can for example be used for dispersion compensation to provide a wavelength dependent time delay to a propagating signal with a finite bandwidth.

Simple periodic fiber Bragg gratings are known in the art, and many different methods have been described for fabricating fiber Bragg gratings. However, it is difficult to fabricate complex fiber Bragg gratings using existing techniques.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Embodiments of the present invention are directed to fabrication of a waveguide grating using stroboscopic exposure. In the following description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Some parts of this description will be presented using terms such as stress, silicon, reflectivity, spectrum, reflectance, and so forth. These terms are commonly employed by those skilled in the art to convey the substance of their work to others skilled in the art.

Various operations will be described as multiple discrete blocks performed in turn in a manner that is most helpful in understanding the invention. However, the order in which they are described should not be construed to imply that these operations are necessarily order dependent or that the operations be performed in the order in which the blocks are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
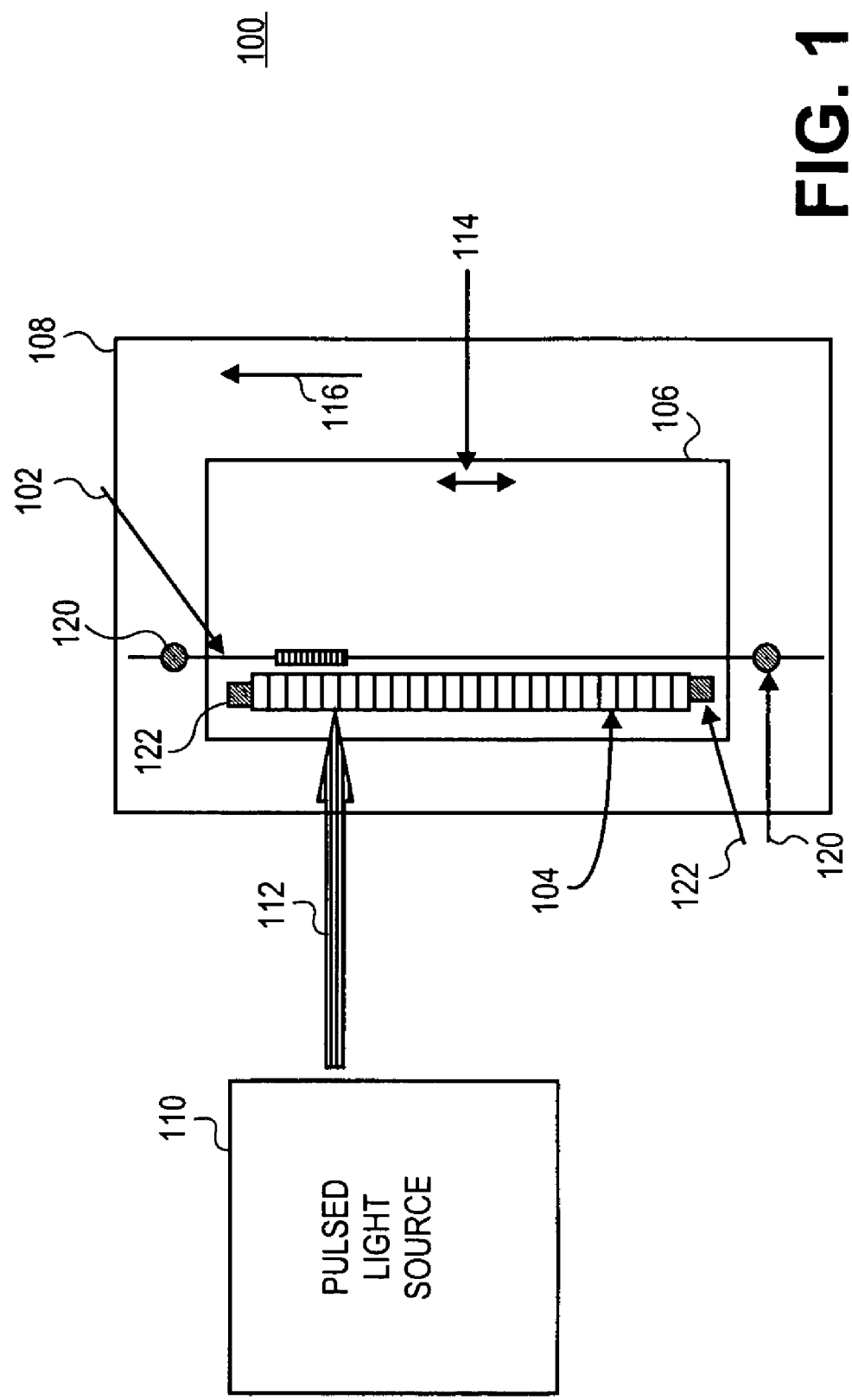
FIG. 1 is a high-level block diagram of a system for fabricating Bragg waveguides according to an embodiment of the present invention.

FIG. 1 is a high-level block diagram of a fabrication system 100, which may be used to fabricate Bragg gratings according to embodiments of the present invention. The fabrication system 100 includes an optical waveguide 102 and an interference pattern generator 104. The fabrication system 100 also includes motion equipment 106 coupled to the optical waveguide 102 and discrete motion equipment 108 coupled to the motion equipment 106. The fabrication system 100 also may include a pulsed light source 110, which produces light pulses 112.

In one embodiment of the present invention, the optical waveguide 102 may be an optical fiber or a planar waveguide doped with photosensitive material. For example, the optical waveguide 102 may be one or a combination of germanium-doped silica fiber, a germaniumboron co-doped silicate fiber, a tin-germanium co-doped fiber, an optical fiber subjected to high-pressure hydrogenation a rare-earth-doped optical fiber, and/or any suitable optical fiber. In embodiments of the present invention in which the optical waveguide 102 is a planar waveguide, the optical waveguide 102 may be similarly doped and disposed on a substrate, such as a silicon-on-insulator (SOI) substrate, a silicon substrate, or other suitable substrate.

The photosensitive material responds to exposure from ultraviolet (UV) light based on a response time. The response time of the photosensitive material is based on the particular material. Response times for photosensitive materials are well known.

According to embodiments of the present invention, the interference pattern generator 104 may be any suitable device that facilitates writing a Bragg grating into or onto an optical waveguide. For example, the interference pattern generator 104 may be a phase grating, such as a phase mask or a diffraction grating. In this and other embodiments of the present invention, the interference pattern generator 104 may be a transmission phase grating (e.g., a single phase mask, several phase masks, a single phase grating, or a several phase gratings). The specific application or function for the resulting Bragg grating determines the type of interference pattern generator 104 (e.g., a phase mask or a diffraction grating). Suitable devices may be one or more Lasiris phase masks available from StockerYale Inc., in Salem, N.H.

The interference pattern generator 104 may be located in close proximity to the optical waveguide 102. However, the actual position of the interference pattern generator 104 relative to the optical waveguide 102 may depend on the position of other optics (shown below) between to the optical waveguide 102 and the interference pattern generator 104 or other factors (described below).

The motion equipment 106 may be any suitable translation stage that is capable of moving the optical waveguide 102 relative to the interference pattern generator 104 in the direction indicated by the arrow 114, for example. In one embodiment of the present invention, the motion equipment 106 may be a translation stage controlled by a piezoelectric actuator, which moves the optical waveguide 102 relative to the interference pattern generator 104 to generate a phase profile for a Bragg grating. In an alternative embodiment of the present invention, the motion equipment 106 dithers the optical waveguide 102 at a rate relative to the interference pattern generator 104 to generate an amplitude profile for a Bragg grating. Suitable motion equipment may be a NanoStage available from Mad City Labs in Madison, Wis.

The discrete motion equipment 108 may be a translation stage that provides relative motion between the light pulses 112 and the combination of the optical waveguide 102 and the interference pattern generator 104 in discrete increments along the length (longitudinal axis) of the optical waveguide 102 in the direction indicated by the arrow 116, for example. In an embodiment of the present invention, the discrete motion equipment 108 may be any well-known suitable stepper motor. In an alternative embodiment of the present invention, the motion equipment 108 may be a DC motor used in an incremented or discrete translation format.

The pulsed light source 110 may be any light source that can emit pulses of ultraviolet (UV) light at predetermined pulse repetition rates and pulse durations. For example, the pulses in the light pulses 112 have durations of twenty nanoseconds. In an embodiment of the present invention, the pulsed light source 110 may be any suitable KrF excimer laser. Alternatively, the pulsed light source 110 may be an amplitude modulated (AM) continuous wave (CW) light source.

The optical waveguide 102 may be mounted to the motion equipment 108 via attachments 120. The interference pattern generator 104 may be mounted to the motion equipment 106 via attachments 122.

A particular Bragg grating has diffraction efficiency, which is commonly less than one hundred percent (100%) based on how much light is diffracted into the order(s) of interest and how much light is diffracted into other orders. In general, diffraction efficiency of a particular grating is a function of the wavelength, polarization, and angle of incident light, the surface profile and period of the Bragg grating, and the refractive indexes of the materials in the grating (e.g., of the photosensitive material (e.g., germanium) and of the host material (e.g., silica).

For example, the interference pattern generator 104 provides two degrees of freedom to tune the diffraction efficiency of a Bragg grating. The distance between grooves or spaces in the interference pattern generator 104 provides a first degree of freedom. The depth of the grooves or spaces in the interference pattern generator 104 provides a second degree of freedom. The motion of the motion equipment 106 (e.g., dithering the optical waveguide relative to the interference pattern generator 104) provides a third degree of freedom. The motion of the discrete motion equipment 108 (e.g., moving the optical waveguide and the interference pattern generator 104 relative to the light pulses 112 from the pulsed light source 110) provides a fourth degree of freedom.

Figure 2:
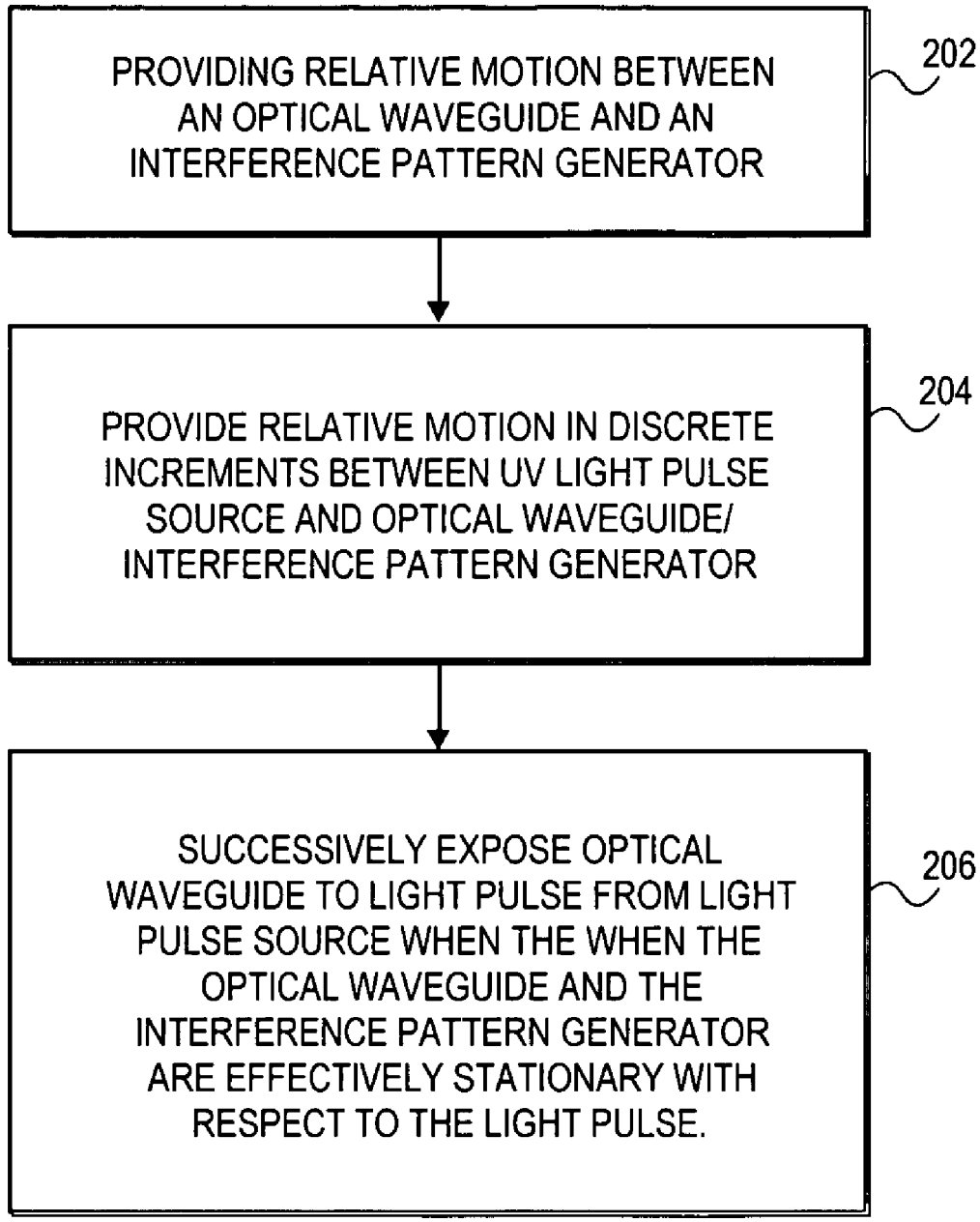
FIG. 2 is a flowchart of a method of fabricating Bragg gratings according to an embodiment of the present invention.

FIG. 2 is a flowchart of a method 200 of generating a Bragg grating according to embodiments of the present invention. A machine-readable medium with machine-readable instructions thereon may be used to cause a processor to perform the process 200.

A block 202 provides relative motion between a photosensitive material doped optical waveguide and an interference pattern generator. In one embodiment of the present invention, the motion equipment 106 may provide the relative motion between the optical waveguide 102 and the interference pattern generator 104.

According to embodiments of the present invention, relative motion is provided between the optical waveguide 102 and the interference pattern generator 104 that is slower than the response time of the photosensitive material of the optical waveguide 102. This relative motion may be used to generate a phase profile for the Bragg grating.

Alternatively, relative motion is provided between the optical waveguide 102 and the interference pattern generator 104 in an oscillatory manner at a rate whose period is shorter than the response time of the photosensitive material of the optical waveguide 102. Providing relative motion between the optical waveguide 102 and the interference pattern generator 104 at a rate whose period is shorter than the response time of the photosensitive material of the optical waveguide 102 may be used to generate an amplitude profile for the Bragg grating.

A block 204 provides relative motion in discrete increments between a light pulse source and the doped optical waveguide/interference pattern generator along a longitudinal axis of the doped optical waveguide. In one embodiment of the present invention, the pulsed light source 110 is moved in discrete increments along a longitudinal axis of the optical waveguide 102 and relative to the optical waveguide 102 and the interference pattern generator 104. In an alternative embodiment of the present invention, the pulsed light source 110 remains stationary and the optical waveguide 102/interference pattern generator 104 are moved together in discrete increments along the length (longitudinal axis) of the optical waveguide 102.

A block 206 successively exposes the doped optical waveguide to light pulses through the interference pattern generator when the doped optical waveguide and the interference pattern generator are effectively stationary with respect to the light pulse. In one embodiment of the present invention, the doped optical waveguide 102 is successively exposed to a light pulse from the light pulse source 110 through the interference pattern generator 104 when the doped optical waveguide 102 and the interference pattern generator 104 are effectively stationary with respect to the light pulse.

When the light pulse duration is shorter than the time period over which the relative interference pattern generator 104/doped optical waveguide 102 position is constant and the pulsing of the light pulse source 110 is synchronized with the discrete relative motion between the light pulse source 110 and the doped optical waveguide 102/interference pattern generator 104, then the relative doped optical waveguide 102/interference pattern generator 104 position does not vary as different regions of the Bragg grating are generated. Rather, the generation of the Bragg grating occurs when a light pulse is present and the doped optical waveguide 102/interference pattern generator 104 is effectively stationary relative to the light pulse from the light pulse source 110. According to an embodiment of the present invention, relative discrete motion of the doped optical waveguide 102 and interference pattern generator 104 is synchronized with discrete motion of the doped optical waveguide 102/interference pattern generator 104 relative to the light pulse of the light pulse source 110.

Determining whether the doped optical waveguide 102/interference pattern generator 104 is effectively stationary relative to the light pulse from the light pulse source 110 depends on the duration of the light pulse and the details of the digitized motion of the motion equipment 108 and/or the motion equipment 106 (e.g. the number of bits of digitization and the velocity of the motion). According to an embodiment of the present invention, when the light pulse duration is short relative to the shortest time between increments in the motion of the motion equipment 106 and 108, then the doped optical waveguide 102/interference pattern generator 104 is effectively stationary relative to the light pulse from the light pulse source 110.

For purposes of illustration, assume the light pulse source 110 emits light pulses having pulse durations of twenty nanoseconds (20 ns). Assume also that the motion equipment 106 drive voltage for the piezoelectric crystal is digitized with n bits ($2^n$ levels) for its full range of travel. Assume also that the time for a full travel scan of the motion equipment 106 is approximately fifty milliseconds (ten Hz modulation). For sixteen-bit digitization, the time between increments (when the motion equipment 106 is stationary) is approximately eight hundred nanoseconds. This is approximately forty times longer than the pulse duration and so the doped optical waveguide 102 and interference pattern generator 104 are effectively stationary relative to each other.

By synchronizing the pulsing of the light pulse source 110 with the motion of the motion equipment 106, one can ensure that there is no relative motion between the doped optical waveguide 102 and the interference pattern generator 104 while the Bragg grating is being generated. Of course, a larger number of bits will reduce the time between discrete increments of the motion equipment 106. However, since the full travel range on the motion equipment 106 is typically very small (approximately twenty-five microns), sixteen bits should be sufficient to achieve the appropriate resolution for the doped optical waveguide 102/interference pattern generator 104 position.

Even in the case where the relative doped optical waveguide 102/interference pattern generator 104 motion is not discrete (i.e., continuous scanning), for most practical situations, the motion is so small that the doped optical waveguide 102/interference pattern generator 104 relative position can be considered to be virtually constant during each exposure.

Determining the extent of the relative motion of the doped optical waveguide 102 and the interference pattern generator 104 and the light pulse from the light pulse source 110 during exposure of the doped optical waveguide to the light pulse depends on the duration of the light pulse and the velocity of the relative motion between the doped optical waveguide 102 and the interference pattern generator 104. According to an embodiment of the present invention, the light pulse duration may be twenty ns and the velocity of the motion may be twenty-five nanometers per second (nm/s). This gives rise to a relative motion of no more than approximately 0.05 picometers (pm) during any given exposure, which corresponds to one part in ten thousand of a Bragg grating period.

Effectively, this motion can be neglected because it is virtually undetectable and has no measurable effect on the physical structure of the Bragg grating. Between exposures, the maximum relative motion between the doped optical waveguide 102 and the interference pattern generator 104 is approximately fifty nm corresponding to about ten percent (10%) of the Bragg grating period.

Although various embodiments of the present invention have been described in the context of a standard single-phase mask exposure technique, Bragg gratings may be fabricated according to embodiments of the present invention using conventional interferometric methods as well as more advanced multiple phase mask techniques.

Embodiments of the invention can be implemented using hardware, software, or a combination of hardware and software. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   moving a photosensitive material doped optical waveguide relative to an interference pattern generator at a speed and/or at a period associated with a profile of a Bragg grating;

while moving the photosensitive material doped optical waveguide relative to the interference pattern generator at the speed and/or at the period associated with the profile of the Bragg grating, moving the photosensitive material doped optical waveguide and the interference pattern generator in discrete increments along a longitudinal axis of the photosensitive material doped optical waveguide;

while moving the photosensitive material doped optical waveguide relative to the interference pattern generator at the speed and/or at the period associated with the profile of the Bragg grating and while moving the photosensitive material doped optical waveguide and the interference pattern generator in discrete increments along a longitudinal axis of the photosensitive material doped optical waveguide, moving an ultraviolet (UV) light pulse source in discrete increments along the longitudinal axis of the photosensitive material doped optical waveguide; and while moving the photosensitive material doped optical waveguide relative to the interference pattern generator at the speed and/or at the period associated with the profile of the Bragg grating, while moving the photosensitive material doped optical waveguide and the interference pattern generator in discrete increments along a longitudinal axis of the photosensitive material doped optical waveguide, and while moving the ultraviolet (UV) light pulse source in discrete increments along the longitudinal axis of the photosensitive material doped optical waveguide, exposing the photosensitive material doped optical waveguide to an ultraviolet (UV) light pulse from the ultraviolet (UV) light pulse source through the interference pattern generator when the photosensitive material doped optical waveguide and the interference pattern generator are effectively stationary with respect to each other and the ultraviolet (UV) light pulse source is effectively stationary with respect to the effectively stationary photosensitive material doped optical waveguide and interference pattern generator combination.

2. The method of claim 1, further comprising moving the photosensitive material doped optical waveguide at a speed that is slower than a response time of the photosensitive material.

3. The method of claim 2, further comprising dithering the photosensitive material doped optical waveguide at a rate whose period is faster than the response time of the photosensitive material.

4. The method of claim 1, further comprising moving an optical fiber and the interference pattern generator relative to each other.

5. The method of claim 1, further comprising moving a planar waveguide and the interference pattern generator relative to each other.

6. The method of claim 1, further comprising moving the photosensitive material doped optical waveguide and a phase mask relative to each other.

7. The method of claim 1, further comprising moving the photosensitive material doped optical waveguide and the interference pattern generator based on a response time of a germanium-doped optical waveguide.

8. The method of claim 1, further comprising moving the ultraviolet (UV) light pulse source in discrete increments using a stepper motor.

9. The method of claim 1, further comprising successively exposing the photosensitive material doped optical waveguide to the ultraviolet (UV) light pulse from an excimer laser.

10. A system, comprising:

translation motion equipment to move a photosensitive material doped optical waveguide relative to an interference pattern generator at a speed and/or at a period associated with a profile of a grating;

first discrete motion equipment to move the photosensitive material doped optical waveguide and the interference pattern generator in discrete increments along a longitudinal axis of the photosensitive material doped optical waveguide while the translation motion equipment is moving the photosensitive material doped optical waveguide relative to the interference pattern generator at the speed and/or at the period associated with the profile of a grating;

a light pulse source to successively expose the photosensitive material doped optical waveguide to light pulses through the interference pattern generator while the first discrete motion equipment is moving the photosensitive material doped optical waveguide and an interference pattern generator in discrete increments along a longitudinal axis of the photosensitive material doped optical waveguide and while the translation motion equipment is moving the photosensitive material doped optical waveguide relative to the interference pattern generator at the speed and/or at the period associated with the profile of a grating; and second discrete motion equipment to move an ultraviolet (UV) light pulse source in discrete increments along a longitudinal axis of the photosensitive material doped optical waveguide, wherein, while moving the photosensitive material doped optical waveguide relative to the interference pattern generator at the speed and/or at the period associated with the profile of the Bragg grating, while moving the photosensitive material doped optical waveguide and the interference pattern generator in discrete increments along a longitudinal axis of the photosensitive material doped optical waveguide, and while moving the ultraviolet (UV) light pulse source in discrete increments along the longitudinal axis of the photosensitive material doped optical waveguide, the light pulse source is further to successively expose the photosensitive material doped optical waveguide to light pulses through the interference pattern generator when the photosensitive material doped optical waveguide and the interference pattern generator are effectively stationary with respect to each other and the ultraviolet (UV) light pulse source is effectively stationary with respect to the effectively stationary photosensitive material doped optical waveguide and interference pattern generator combination.

11. The system of claim 10, wherein the photosensitive material doped optical waveguide comprises an optical fiber.

12. The system of claim 11, wherein the optical fiber is a germanium-doped optical fiber.

13. The system of claim 10, wherein the light pulse source is an excimer laser.

14. The system of claim 10, wherein the light pulse source is an amplitude-modulated (AM) continuous wave (CW) light source.

15. The system of claim 10, wherein the interference pattern generator includes multiple phase masks.

16. The system of claim 10, wherein the photosensitive material doped optical waveguide comprises a planar waveguide.

17. The system of claim 10, wherein the first motion equipment comprises a piezoelectric translation stage.

18. The system of claim 17, wherein the second discrete motion equipment comprises a stepper motor.

19. The system of claim 10, wherein the interference pattern generator comprises a single-phase mask.

20. A method, comprising:
    moving a photosensitive material doped optical waveguide relative to an interference pattern generator at a first speed associated with a phase profile of a Bragg grating and at a period associated with an amplitude profile of the Bragg grating;
    moving the photosensitive material doped optical waveguide and the interference pattern generator together in discrete increments along a length of the photosensitive material doped optical waveguide based on a Bragg grating length; and
    successively exposing the photosensitive material doped optical waveguide to pulsed light through the interference pattern generator when the photosensitive material doped optical waveguide and the interference pattern generator are effectively stationary with respect to each other and the pulsed light is effectively stationary relative to the effectively stationary combination of the photosensitive material doped optical waveguide and the interference pattern generator.

21. The method of claim 20, further comprising moving a planar waveguide relative to a transmission phase grating.

22. The method of claim 21, further comprising moving the optical waveguide relative to the interference pattern generator at a period faster than a response time of the photosensitive material doped optical waveguide.

23. The method of claim 22, further comprising moving the optical waveguide relative to the interference pattern generator slower than the response time of the photosensitive material doped optical waveguide.

24. The method of claim 23, further comprising moving an optical fiber relative to a single phase mask.

25. The method of claim 23, further comprising moving a planar waveguide relative to multiple phase masks.

* * * * *